United States Patent [19]

Swinbanks et al.

[11] Patent Number: 4,615,135
[45] Date of Patent: Oct. 7, 1986

[54] KNOTLESS WEIGHT BOOM

[75] Inventors: Duncan J. Swinbanks; Brian J. Swinbanks, both of Isle of Mull, Scotland

[73] Assignee: Knotless Fishing Tackle Ltd., Isle of Mull, Scotland

[21] Appl. No.: 714,368

[22] Filed: Mar. 21, 1985

[30] Foreign Application Priority Data

Mar. 22, 1984 [GB] United Kingdom ................ 8407444

[51] Int. Cl.⁴ ............................................ A01K 95/00
[52] U.S. Cl. .................................... 43/43.13; 43/44.9
[58] Field of Search ................... 43/43.1, 43.13, 44.9, 43/44.92, 44.95

[56] References Cited

U.S. PATENT DOCUMENTS

| | | | |
|---|---|---|---|
| 231,417 | 8/1880 | Foote | 43/44.9 |
| 2,459,287 | 11/1949 | Robbins | 43/44.95 |
| 2,470,995 | 5/1949 | Lesser | 43/44.95 |
| 3,090,153 | 5/1963 | Clark | 43/43.13 |
| 3,645,032 | 2/1922 | Gilliam | 43/44.9 |

*Primary Examiner*—Nicholas P. Godici
*Assistant Examiner*—Christopher L. McKee
*Attorney, Agent, or Firm*—Leydig, Voit & Mayer, Ltd.

[57] ABSTRACT

The present invention provides a knotless weight boom 1 for a fishing line 2 comprising an elongate body 7 having a laterally extending boom member 8 for use in weighting the boom 1, said body 7 having at least one longitudinally extending transverse slot or channel 12 having an inlet 13 provided, intermediate its ends 14, with generally tongue shaped elongate retainer 15 extending from the inlet 13 of the respective slot or channel 12 and having a root portion 16 extending laterally from one side of the slot or channel 12 at or in proximity to said inlet 13. The body 7 also has elongate outer groove means 11 extending longitudinally of the body 7, either side of the inlet 13 so as to define a substantially direct pathway for receiving the line 2, in use, with a loose sliding fit, said pathway extending along the base of the outer groove means 11 and the base 20 of an inner groove means 19, defined between the tongue shaped retainer means 15 and slot or channel side 17 to which its root portion 16 is connected. In use of the boom 1 a loop 22 can be taken in the line 2, fed into said inlet 13, and hooked over said retainer means 15, and the line 2 then pulled back to seat it in said pathway extending along said inner and outer groove means 19, 11 whereupon the boom 1 can freely slide along said line 2 while being substantially securely retained thereon.

10 Claims, 4 Drawing Figures

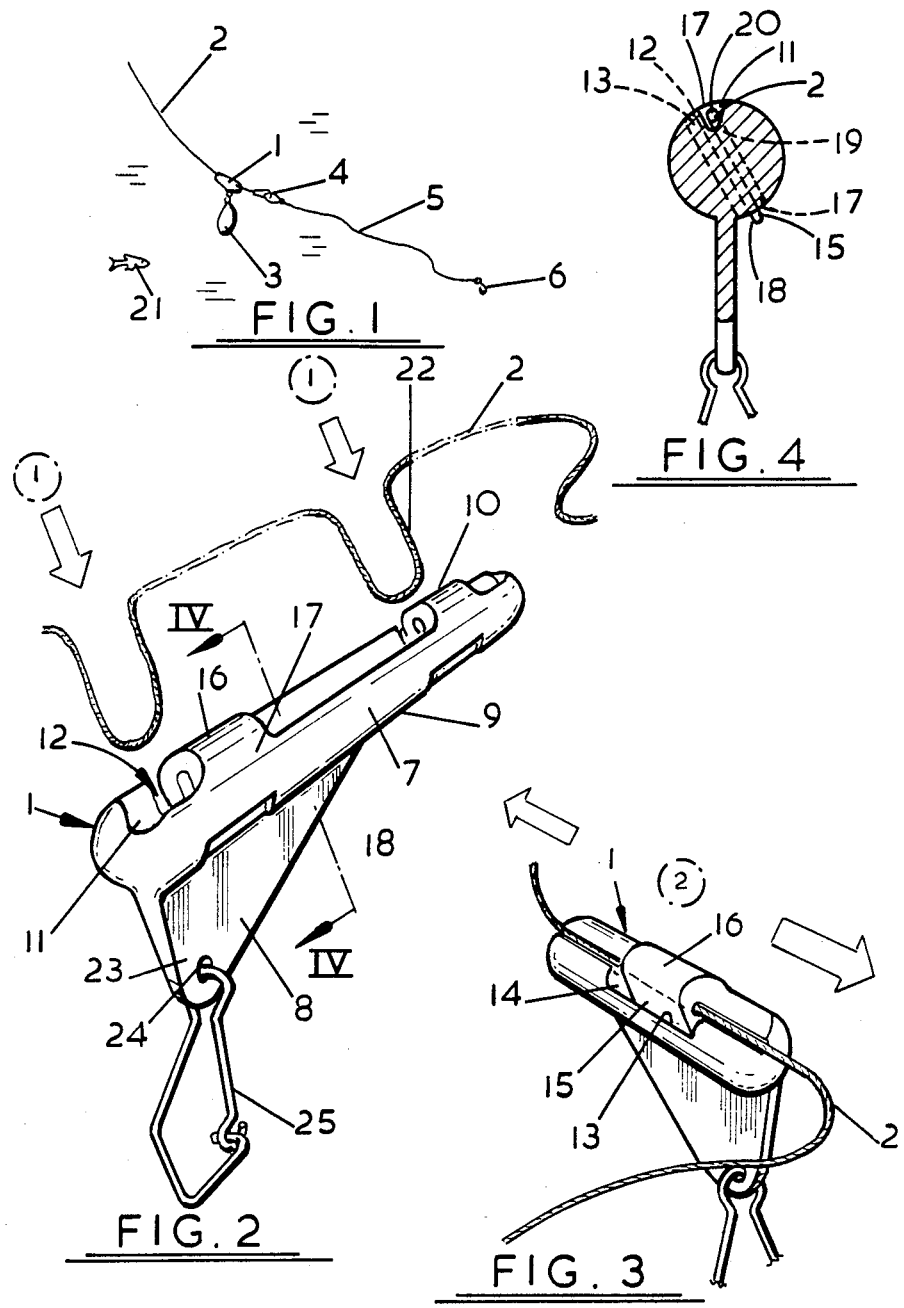

KNOTLESS WEIGHT BOOM

This invention relates to fishing tackle and in particular to a knotless weight boom.

Conventionally weight booms are attached to fishing lines by threading onto the line. In practice though there often arises the need due to for example changes in conditions or different types of fish entering the fishing zone, for changing part of the tackle being used. This necessitates untying of the knots and/or cutting of the line which can be relatively difficult, time consuming, and/or result in added expenses due to loss of tackle.

It is an object of the present invention to avoid or minimise one or more of the above disadvantages.

The present invention provides a knotless weight boom for a fishing line which boom comprises an elongate body having a laterally extending boom member for use in weighting the boom, said body having a least two longitudinally extending and spaced apart transverse slots or channels having inlets provided with elongate retainer means intermediate their ends, said retainer means each being generally tongue shaped and extending substantially from the inlet of the respective slot or channel and having a root portion extending laterally from one side of the slot or channel at or in proximity to said inlet, said body also having elongate open groove means extending longitudinally of the body either side of the inlets so as to define a substantially direct pathway for receiving the line, in use, with a loose sliding fit, said pathway extending along the base of the outer groove means and the base of a covered groove means, defined between the tongue shaped retainer means and slot or channel sides to which their root portions are connected, whereby in use spaced apart loops can be taken in the line, fed into said inlets, and hooked over said retainer means, and the line then pulled back to seat it in said pathway extending along said inner and outer groove means whereupon the boom can freely slide along said line whilst being substantially securely retained thereon.

Thus a weight boom of the present invention can be very quickly and easily applied to a fishing line without the need for tying or untying of any knots thereby enabling an angler to react very quickly to different requirements.

Preferably the boom is disposed on the opposite side of the body from the slot or channel inlets, most preferably slightly further from the slot or channel side to which the tongue root portion is connected than from the other slot or channel side so as to maximise resistance to accidental release of the line from the retainer means.

The boom may itself be weighted or more conveniently provided with suitable attachments means e.g. aperture and/or snap link means for securing of a weight thereto.

Further preferred features and advantages of the invention will appear from the following detailed description given by way of example of two preferred embodiments illustrated with reference to the accompanying drawings in which:

FIG. 1 is a general view of a weight boom of the invention in use on a fishing line;

FIG. 2 is a perspective view illustrating attachments of the boom of FIG. 1 to the line;

FIG. 3 is a perspective view of a second boom on a line; and

FIG. 4 is a transverse cross-section in the line IV—IV in FIG. 2.

FIG. 1 shows a weight boom 1 of the invention attached to a fishing line 2 and supporting a weight 3. The line includes snap-link swivel connection means 4 below the weight boom for connection of a short line 5 at whose free end is actually secured the hook 6 being used.

As may be seen in FIGS. 2 to 4 the boom 1 comprises a generally cylindrical elongate body 7 with a generally triangular fin-like boom member 8 extending longitudinally part-way along the underside 9 of the body 7.

Along the upper side 10 of the body extend alternately open groove means 11 and slots 12 which extend from inlets 13 at said upper side 10 of the body 7 through to the underside 9 of the body 7 to one side of the boom member 8 axis. Inside each slot 12 and intermediate its ends 14 is provided a retaining means in the form of a tongue 15 having a laterally extending root portion 16 connecting it to one side 17 of the slot 12 at the inlet 13.

The distal end 18 of the tongue 15 projects slightly proud of the underside 9 of the body 7 to minimize the possibility of accidental disengagement of the line from the retaining means.

As will be apparent from FIG. 4 in particular a covered groove means 19 is defined between the tongue 15 and said side 17 of the slot 12 to which it is attached, the base 20 of said covered groove means 19 being substantially aligned with said open groove means 11 so that together they define a substantially rectilinear pathway for receiving the line 1 and so that the boom 1 can hang on the line from said tongues root portions 16 at said inner groove means 19 and be freely slidable along the line whereby when a fish 21 takes the hook 6 it does not feel any significant resistance due to the weight boom 1.

In use two small loops 22 are taken in the line and fed into slots in their inlets and over the distal ends 18 of the tongues 15. The line is then simply pulled taut drawing it into the covered groove means 19 where it is securely retained.

At its free corner 23 the boom member 8 is provided with an aperture 24 through which is attached a snap link 25 for attachment in turn of the weight 3.

As may be seen in FIG. 4 the boom member 8 is disposed relative to the slot 12 so that when the boom 1 hangs from the line 2 the covered groove means 19 is inclined at an angle to the vertical and above the inlet side of the slot 12 such that the tongue 15 in effect is hooked under the line 2 in the normal operating attitude of the boom as shown in FIG. 4 whereby resistance to accidental escape of the line from the tongue 12 is maximized.

FIG. 3 shows a second embodiment suitable for use in freshwater fishing where generally lighter duty tackle is used, and is generally similar to the first embodiment except that only a single slot 13 and retainer 15 are employed. Since the boom itself is quite small in size (as compared with the seawater version) the slot and tongue are considerably narrower so that the risk of the line accidentally forming a loop when the boom is lying on the river or lake bed, which loop could work its way around and off the retainer is so small that a single retainer provides adequate security of attachment.

Naturally various modifications may be made to the abovedescribed embodiments without departing from the scope of the present invention. Thus for example the slot could be closed off at the body underside below the distal end of the tongue (which would need to be somewhat shorter in this case) i.e. the slot would be replaced by a channel. Also the boom member shape could be different and/or its disposition changed, for example to between the two slots. Also more than two slots and corresponding engagement means may be provided. As regards the slots or channel disposition this could also be modified e.g. so as to be in the same plane as the boom. Also the 'slots' could be bores with cylindrical tongues.

The boom may be made of any suitable material which is reasonably strong and corrosion-resistant. Conveniently the boom is made of a plastic material. Moreover by using a heavy material the boom itself may be made sufficiently heavy to avoid the need for using a separate weight member Attached to the boom.

It will also be appreciated from the above description that a particular advantage obtainable with the invention is the achievement of a relatively secure and at the same time mobile attachment to a line in a simple manner without the need for using any separate moving parts which can be lost, require separate manipulation, and increase manufacturing and assembly costs.

What is claimed is:

1. A knotless weight boom for a fishing line which boom comprises an elongate body having a laterally extending boom member for use in weighting the boom, said body having an elongate groove means extending longitudinally and within the body, said elongate groove means having open portions and at least two covered portions along its length, said covered portions defined by at least two respective tongue-like retainer means extending from a root portion at the side of said elongate groove means in a substantially arcuate or bent manner about said elongate groove means, each retainer means further extending into and at least partially through at least two respective transverse axially parallel slots or channels, said slots or channels extending from a bottom portion of said elongate groove means through said elongate body, said slots or channels being sized to allow respective loops taken in the fishing line to be fed into said slots and hooked over said retainer means whereby the line may then be pulled back to seat it in said elongate groove means, said elongate groove means sized to receive the fishing line with a loose sliding fit whereby the boom can freely slide along the line while being substantially securely retained thereon.

2. A boom according to claim 1 wherein said boom member is generally planar.

3. A boom according to claim 2 wherein said retainer extends in a plane relative to said boom member such that the inner side face of the retainer faces upwardly away from the direction in which said boom member extends thereby to maximize security of retention of the line thereby.

4. A boom according to claim 3 wherein said boom member is generally triangular.

5. A boom according to claim 4 wherein said boom has detachably connected thereto a weight member.

6. A boom according to claim 5 wherein the distal end of said retainer means projects outwardly of the slot.

7. A boom according to claim 1 which boom is made of a plastic material.

8. A boom according to claim 7 wherein said body has a first one of said at least two slots or channels having a first end remote from the other of said at least two slots or channels and said boom member is provided with a weight member attached to said boom member at a position substantially directly below said first end of said first one of said at least two slots or channels when said boom with said weight connected thereto are suspended on said fishing line in use of the boom.

9. A boom member according to claim 8 wherein said weight member is detachably connected to said boom member.

10. A boom according to claim 1 wherein said elongate body is generally cylindrical.

* * * * *